US008540043B2

(12) United States Patent
Mehlos et al.

(10) Patent No.: US 8,540,043 B2
(45) Date of Patent: Sep. 24, 2013

(54) OVER BULKHEAD AIR INTAKE FOR REDUCED SNOW INGESTION

(75) Inventors: James P. Mehlos, Worthington, OH (US); Brandy Kay Laakso, Marysville, OH (US); Clifford Randall Salvesen, Ostrander, OH (US); Timothy T. Laakso, Marysville, OH (US); Anthony John Leanza, Powell, OH (US); Patrick M. Shafer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 13/082,100

(22) Filed: Apr. 7, 2011

(65) Prior Publication Data

US 2012/0048632 A1 Mar. 1, 2012

Related U.S. Application Data

(60) Provisional application No. 61/378,296, filed on Aug. 30, 2010.

(51) Int. Cl.
*B62D 25/13* (2006.01)
(52) U.S. Cl.
USPC ............ 180/69.25; 180/68.1; 180/68.3
(58) Field of Classification Search
USPC .......... 180/68.1, 68.2, 68.3, 68.4; 123/41.04, 123/41.05, 41.06, 41.07, 184.21, 198 E; 296/193.1, 193.09, 208
See application file for complete search history.

(56) References Cited

U.S. PATENT DOCUMENTS

| 1,846,283 | A | 2/1932 | Summers |
| 1,957,919 | A | 5/1934 | Tice |
| 2,197,503 | A | 4/1940 | Martin |
| 2,684,204 | A | 7/1954 | Lamb |
| 2,881,860 | A | 4/1959 | Ternes |
| 2,913,065 | A | 11/1959 | Lyon, Jr. |
| 3,696,730 | A | 10/1972 | Masuda et al. |

(Continued)

FOREIGN PATENT DOCUMENTS

| JP | 62110023 | 5/1987 |
| JP | 07004133 | 1/1995 |

(Continued)

OTHER PUBLICATIONS

International Search Report and Written Opinion of PCT/US2011/045885 dated Dec. 9, 2011.

(Continued)

*Primary Examiner* — Jeffrey J Restifo
*Assistant Examiner* — Erez Gurari
(74) *Attorney, Agent, or Firm* — Rankin, Hill & Clark LLP

(57) ABSTRACT

A bulkhead cover for a vehicle air intake system includes a forward wall defining a bulkhead cover primary port for receiving an air flow admitted through a grille of a vehicle, a first side wall extending from an outer lateral side of the forward wall to an outer lateral side of an intake enclosure, and a second side wall extending from an inner lateral side of the forward wall to an inner lateral side of the intake enclosure. The intake enclosure defines an intake port between the outer and inner lateral sides of the intake enclosure. A bulkhead cover auxiliary port is defined in the second side wall for receiving additional air flow admitted through the grille and thereby reducing snow ingestion through the bulkhead cover primary port.

21 Claims, 5 Drawing Sheets

(56) References Cited

U.S. PATENT DOCUMENTS

| | | |
|---|---|---|
| 3,948,234 A | 4/1976 | Shumaker, Jr. |
| 3,987,862 A | 10/1976 | Lidstone |
| 4,164,262 A | 8/1979 | Skatsche et al. |
| 4,420,057 A | 12/1983 | Omote et al. |
| 4,533,012 A | 8/1985 | Komoda |
| 4,548,166 A | 10/1985 | Gest |
| 4,778,029 A | 10/1988 | Thornburgh |
| 4,878,555 A | 11/1989 | Yasunaga et al. |
| 4,932,490 A | 6/1990 | Dewey |
| 4,971,172 A | 11/1990 | Hoffman et al. |
| 5,022,479 A | 6/1991 | Kiser et al. |
| 5,054,567 A | 10/1991 | Hoffman |
| 5,195,484 A | 3/1993 | Knapp |
| 5,251,712 A | 10/1993 | Hayashi et al. |
| 5,417,177 A | 5/1995 | Taguchi et al. |
| 5,564,513 A | 10/1996 | Wible et al. |
| 5,660,243 A | 8/1997 | Anzalone et al. |
| 5,794,733 A | 8/1998 | Stosel et al. |
| 5,860,685 A | 1/1999 | Horney et al. |
| 5,881,479 A | 3/1999 | Pavey |
| 6,056,075 A | 5/2000 | Kargilis |
| 6,059,061 A | 5/2000 | Economoff et al. |
| D433,656 S | 11/2000 | Hanagan et al. |
| 6,276,482 B1 | 8/2001 | Moriya et al. |
| 6,302,228 B1 | 10/2001 | Cottereau et al. |
| 6,453,866 B1 | 9/2002 | Altmann et al. |
| 6,484,835 B1 | 11/2002 | Krapfl et al. |
| 6,510,832 B2 | 1/2003 | Maurer et al. |
| 6,564,768 B2 | 5/2003 | Bauer et al. |
| 6,698,539 B2 * | 3/2004 | Decuir ........................ 180/68.3 |
| 6,804,360 B1 | 10/2004 | Misawa et al. |
| 6,805,088 B2 | 10/2004 | Tachibana et al. |
| 6,880,655 B2 | 4/2005 | Suwa et al. |
| 7,059,439 B2 | 6/2006 | Storz et al. |
| 7,237,635 B2 * | 7/2007 | Khouw et al. ................ 180/68.3 |
| 8,100,209 B2 * | 1/2012 | Goldsberry .................. 180/68.1 |
| 8,127,878 B2 * | 3/2012 | Teraguchi et al. ............ 180/68.3 |
| 2002/0059912 A1 | 5/2002 | Bauer et al. |
| 2002/0078916 A1 | 6/2002 | Altmann et al. |
| 2002/0088656 A1 | 7/2002 | Bergman |
| 2003/0042055 A1 | 3/2003 | Suwa et al. |
| 2003/0188902 A1 | 10/2003 | Decuir |
| 2004/0108152 A1 | 6/2004 | Storz et al. |
| 2004/0231900 A1 | 11/2004 | Tanaka et al. |
| 2005/0023057 A1 | 2/2005 | Maeda et al. |
| 2005/0076871 A1 | 4/2005 | Paek |
| 2005/0230162 A1 | 10/2005 | Murayama et al. |
| 2006/0006011 A1 | 1/2006 | Khouw et al. |
| 2006/0006012 A1 * | 1/2006 | Khouw et al. ................ 180/68.3 |
| 2010/0170734 A1 | 7/2010 | Teraguchi et al. |

FOREIGN PATENT DOCUMENTS

| | | |
|---|---|---|
| JP | 08177658 | 7/1996 |
| JP | 2004190671 | 7/2004 |
| JP | 2005297888 | 10/2005 |
| WO | 0023696 | 4/2000 |

OTHER PUBLICATIONS

2002 Honda CR-V AWD SE 5DR photographs, pp. 1-9.
Honda Web Parts Catalog—v2.2.2, Apr. 2010 showing intake assembly for 2002 Honda CR-V.
Detroit 2002 Mitsubishi Montero Limited 4wd—Center View photograph.
Detroit 2002 BMW X5—Center View photograph.
2002 Nissan Murano—Center View photograph.
NY 2002 Infiniti G35—Center View photograph.
Frankfurt 1999 Mazda 323 1.5 S Exclusive—Center View photograph.
Detroit 2002 Nissan Altima 2.5 S—Engine Open Door photograph.

* cited by examiner

US 8,540,043 B2

OVER BULKHEAD AIR INTAKE FOR REDUCED SNOW INGESTION

This application claims the benefit of U.S. provisional patent application Ser. No. 61/378,296, filed Aug. 30, 2010, which is incorporated by reference in its entirety herein.

BACKGROUND

The present disclosure generally relates to vehicle air intake systems, and more particularly relates to an over bulkhead air intake for reduced snow ingestion.

Air intake systems provide necessary air to internal combustion engines to aid in the combustion process. Conventional intake systems either draw air from inside the engine compartment or they draw air from outside the vehicle via an exterior intake port. Systems designed where the air is drawn from the inside of the engine compartment commonly suffer a drawback of drawing in warmer and less dense air than exterior air. This reduces the efficiency of the engine compared with the use of cooler exterior air. A solution to address the shortcoming of these systems is to draw in cooler exterior air. However, systems designed where the air is drawn in via an exterior intake port commonly suffer a drawback of drawing in air that includes water or particles (e.g., snow), which can block the engine intake, inhibit air flow, and/or damage the engine.

Some vehicles incorporate design elements specifically for preventing ingestion of water or other particles into the intake port. While such design elements might work satisfactorily on one vehicle design, changes to seemingly unrelated elements may have adverse consequences on the vehicle's ingestion of water or other particles into the engine's intake port. For example, alterations to a vehicle's front-end profile might adversely affect airflow into the intake port when such airflow is guided adjacent and/or through the vehicle's front end. In particular, these alterations might result in the vehicle's intake port receiving an increased amount of snow ingestion.

SUMMARY

According to one aspect, a bulkhead cover for a vehicle air intake system includes a forward wall defining a bulkhead cover primary port for receiving an air flow admitted through a grille of a vehicle, a first side wall extending from an outer lateral side of the forward wall to an outer lateral side of an intake enclosure, and a second side wall extending from an inner lateral side of the forward wall to an inner lateral side of the intake enclosure. The intake enclosure defines an intake port between the outer and inner lateral sides of the intake enclosure. A bulkhead cover auxiliary port is defined in the second side wall for receiving additional air flow admitted through the grille and thereby reducing snow ingestion through the bulkhead cover primary port.

According to another aspect, a vehicle air intake system includes a grille disposed along a forward end of a vehicle. The grille has one or more inlet apertures for admitting airflow. A bulkhead extends laterally across the vehicle rearwardly of the grille. An intake enclosure having an intake port is disposed over the bulkhead. A bulkhead cover extends from the bulkhead to the grille. The bulkhead cover defines a bulkhead cover primary port and a bulkhead cover auxiliary port, both for allowing the airflow admitted by the grille to pass to the intake port of the intake enclosure.

According to a further aspect, a bulkhead cover for an air intake system of a vehicle includes a forward end connected to an upper portion of a grille of the vehicle, and a rearward end connected to a bulkhead of the vehicle. A forward wall defines a primary port for allowing airflow from the grille to pass to an intake port of an intake enclosure disposed over the bulkhead. A side wall defines a secondary port for allowing airflow to pass to the intake port and reducing a vacuum condition at the primary intake port.

DETAILED DESCRIPTION

Figure 1:
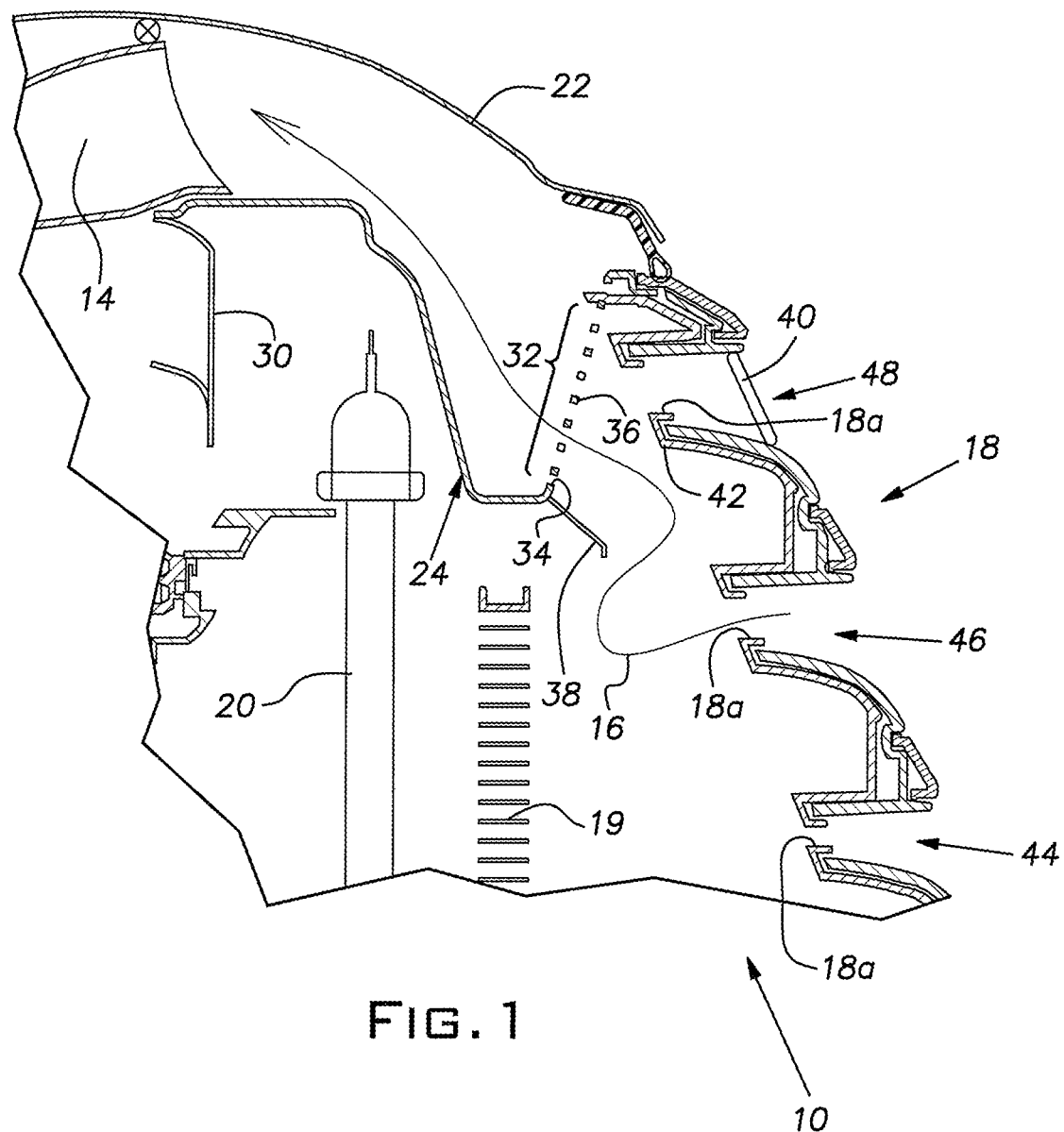
FIG. 1 is a sectional view of a vehicle air intake system having an over bulkhead air intake.

Referring now to the drawings, wherein the showings are for purposes of illustrating one or more exemplary embodiments and not for purposes of limiting same, FIG. 1 illustrates a known vehicle air intake system for a vehicle, the system generally designated by reference numeral 10. As shown, the system 10 generally includes an air intake tube or enclosure 14 and a flow path 16 to the intake enclosure 14, which can be generally formed by grille openings 18a through a front fascia or grille 18, a condenser 19, a radiator 20, a front portion 22 of a hood disposed at the front portion of the vehicle and a bulkhead cover 24. The system 10 generally provides cooler air from outside the engine compartment to the vehicle's engine (not shown) while deterring the ingestion of water and/or particles (e.g., snow) contained in the air from being drawn into the air intake enclosure 14. As will be described in more detail below, the bulkhead cover 24 can itself include features for deterring ingestion of water and/or other particles (e.g., snow) as the airflow path 16 is required to pass through the bulkhead cover 24.

Disposed across a front of the engine compartment is a transverse frame element commonly referred to as a bulkhead 30. The bulkhead 30 is generally a structural frame member that traverses a front region of the engine compartment along a top region of the compartment. The air intake enclosure 14 is disposed above the bulkhead 30 and can be attached directly to the bulkhead 30, to the bulkhead cover 24, and/or to other structures via hardware such as bolts and/or other common connectors. As is known and understood by those skilled in the art, the air intake enclosure 14 provides an air passageway to an air filter unit (not shown), which further channels filtered air to the vehicle's engine (not shown).

As shown, the bulkhead cover 24 is disposed on top of the bulkhead 30 and can be mounted substantially flat on top of the bulkhead 30. The bulkhead cover 24 extends forward from the top of the bulkhead 30 to the top of the grille 18. Between the bulkhead 30 and the grille 18, the bulkhead cover 24 can include a forward wall 32 defining a bulkhead cover port 34 for receiving air flow admitted through the grille 18 of the vehicle (i.e., the path 16 passes through the port 34). A screen 36 can be disposed over the bulkhead cover port 34. In the embodiment illustrated in FIG. 1, the forward wall 34 and thus the port 32 and screen 36 face forward and downward at a negative angle relative to a direction of travel of the vehicle. A deflector 38 can be disposed below the bulkhead cover port 34 and can extend forwardly therefrom toward the grille 18. This can advantageously route the air flow path 16 circuitously so as to further inhibit moisture and/or particles from reaching the intake enclosure 14.

The screen 36 of the bulkhead cover 24 forms an air permeable barrier across the flow path 16 for inhibiting moisture droplets and/or relatively large particles (e.g., snow) from entering the air intake enclosure 14 without significantly affecting the flow rate of the incoming air. In particular, the screen 36 can have holes that are small enough to screen out most debris, but not too small to significantly restrict air flow. For example, the screen 36 can include holes having an area of about 140 square millimeters which will prevent the ingress of most debris and permit good air flow there through. The moisture droplets and/or particles may be from dust, water, snow or particles splashed or thrown on the front of the vehicle, as well as from moisture or particles carried by intake air received through the grille 18. The screen 36 can provide an initial deflection of these items, which can advantageously prevent the intake system from being clogged. The screen 36 can be integrally formed with the forward wall 32 as is shown in the illustrated embodiment.

The grille 18 can include a blocked portion 40 disposed near the bulkhead cover port 34. More specifically, the grille 18 can include a plurality of air flow inlet recesses 44, 46, 48, which include the apertures 18a. In the illustrated embodiment, the blocked portion 40 extends across an uppermost one of the apertures 18a of the grille 18, which is located directly across from the bulkhead cover port 34. The blocked portion 40 can be a wall disposed across the uppermost recess 48 closing its aperture 18a for preventing airflow from passing therethrough. This prevents air flow from entering the grille 18 and passing straight into the bulkhead cover intake port 34. Instead, the air flow path 16 must pass through one of the lower apertures 18a of the grille 18 and circuitously route to the bulkhead cover port 34, including around the deflector 38. In particular, in the embodiment illustrated in FIG. 1, a longitudinal distance between the grille 36 and a portion 42 of the grille 18 defining a lower side of the uppermost aperture 18a can be approximately 30 millimeters.

With reference to FIGS. 2-5, another vehicle air intake system for a vehicle is shown according to an alternate embodiment and is generally designated by reference numeral 50. Like the system 10, the system 50 can include a grille 52 disposed along a forward end of the vehicle with the grille 52 having one or more inlet apertures 54 for admitting air flow into an engine compartment of the vehicle. The system 50 can further include a bulkhead 56 extending laterally across the vehicle rearwardly of the grille 52 and an intake enclosure 58 having an intake port 60 disposed over the bulkhead 56. The system 50 additionally includes a bulkhead cover 62 extending from the bulkhead 56 to the grille 52. As will be described in more detail below, the bulkhead cover 62 defines a bulkhead cover primary port 64 and a bulkhead cover auxiliary or secondary port 66 (FIGS. 4 and 5), both for allowing the air flow admitted by the grille 52 to pass to the intake port 60 of the intake enclosure 58. A radiator 88 can be disposed rearwardly of the grille 52 and below the bulkhead 56 for receiving a portion of the air flow admitted through the grille 52 (e.g., a majority portion of the air flow with only a limited amount of air flow passing through the bulkhead cover 62 and to the intake port 60).

The bulkhead cover 62 for the vehicle air intake system 50 includes a forward wall 70 defining the bulkhead cover primary port 64 that receives the air flow admitted through the grille 52 of the vehicle. The forward wall 70 faces forward and downward at a negative angle relative to a direction of travel of the vehicle. The bulkhead cover 62 further includes a first side wall 72 extending from an outer lateral side 70a of the forward wall 70 to an outer lateral side 58a of the intake enclosure 58 and a second side wall 74 extending from an inner lateral side 70b of the forward wall 70 to an inner lateral side 58b of the intake enclosure 58. The intake enclosure 58 defines the intake port 60 between the outer and inner lateral sides 58a, 58b of the intake enclosure 58. The bulkhead cover auxiliary port 66 is defined in the second side wall 74 for receiving additional air flow admitted through the grille 52 and thereby reducing snow ingestion through the bulkhead cover primary port 64.

The bulkhead cover 62 further includes a lower wall 76 extending from the forward wall 70 to the intake enclosure 58 below the intake port 60 of the intake enclosure 58. As shown, the lower wall 76 can have a stepped profile or configuration (i.e., the lower wall 76 steps up from the forward wall 70 to the bulkhead 56). The lower wall 76, the forward wall 70 and the first and second side walls 72, 74 together define a bulkhead cover air flow chamber 78 forward of the intake port 60 of the intake enclosure 58. A hood 80 of the vehicle further defines an upper boundary of the bulkhead cover air flow chamber 78. Alternatively, a plastic cover could be disposed over the chamber 78 to define the upper boundary. As shown, the chamber 78 can be disposed below and upstream of the intake port 60. In addition, the hood 80 can include one or more seals 82 that seal against the grille 52, the intake enclosure 58 and/or the bulkhead cover 62 for preventing or limiting air flow passage between these components.

In the illustrated embodiment, a forward end 84 of the bulkhead cover 62 is connected to an upper portion 86 of the grille 52 (e.g., forward end 84 can be formed as a lip extending from the forward wall 70 and resting on a flat surface of the upper portion 86 of the grille 52). A rearward end 86 of the bulkhead cover can be connected to the bulkhead 56 of the vehicle. Additionally, the rearward end 86 can be tucked under a lower end of the intake enclosure 58. In the illustrated embodiment, the sidewall 74 is oriented approximately normal relative to the forward wall 70 and the secondary port 66 defined in the sidewall 74 can be appropriately sized to reduce a vacuum condition at the primary intake port 64 by allowing airflow to pass to the intake port 60 through the secondary port 66.

Like the system 10, the grille 52 of the system 50 includes a plurality of airflow inlet recesses 90, 92, 94. The uppermost one 94 of these recesses 90, 92, 94 includes a blocked portion 96 disposed closely adjacent the bulkhead cover primary port 64 to prevent airflow from passing therethrough. As shown in the illustrated embodiment, the blocked portion 96 restricts air flow into the bulkhead cover primary port 64 by covering approximately 50% of the bulkhead cover primary port 56. More particularly, the upper recessed aperture 94 is disposed closely adjacent to the bulkhead cover primary port 62, whereas lower recessed apertures 90, 92 are disposed below the upper recessed aperture 94 and allow air flow to be admitted through the grille 52. In the illustrated embodiment, the upper recess 94 is blocked by the wall portion 96, which is disposed less than 20 millimeters along a height thereof from the bulkhead cover primary port 64, and more particularly is disposed less than 10 millimeters along the height thereof from the bulkhead cover primary port 64 (e.g., approximately 7 millimeters).

The size of the blocked portion 96 (e.g., covering approximately 50% of the bulkhead cover primary port 64) relative to the bulkhead cover primary port 64 and/or the proximity of the blocked portion 96 relative to the bulkhead cover primary port 64 (e.g., approximately 7 millimeters) has the potential to create a vacuum condition at the primary intake port 64. Such a vacuum condition could result in unwanted particles (e.g., snow) being sucked toward the intake port 60. In particular, having a reduced area for the port 64 results in airflow entering the port 64 at a much higher velocity. This can reduce the opportunity for snow or other larger particles to fall out of the airflow as its passes through the chamber 78 and over the stepped-shape lower wall 76. The auxiliary port 66 disposed in the second side wall 74 of the bulkhead cover 62 mitigates against such a vacuum condition by allowing an additional inlet into the chamber 76 for airflow. Without the vacuum condition, the likelihood of snow ingestion into the intake port 60 is significantly reduced.

In the illustrated embodiment, the bulkhead cover auxiliary port 66 is formed as a plurality of vertically oriented slots, such as three vertically extending slots 66a, 66b, 66c defined in the second side wall 74. As shown, the slots 66a, 66b, 66c can extend along nearly an entire extent of a height of the side wall 74 and can be closely spaced together. Formation as three extending slots 66a, 66b, 66c provides some screening effect (e.g., particles wider than a width of the slots 66a, 66b, 66c would be prevented from entering the chamber 78) and/or allows easier manufacturing of the bulkhead cover 62. In one embodiment, the total area of the auxiliary port 66 is approximately 9.3 cm$^2$ and the total area of the primary port 64 is approximately 109 cm$^2$ with approximately 50% of the primary port 64 blocked by the portion 96.

Similar to the system 10, a screen 100 can be disposed over the bulkhead cover primary port 64 and a deflector 102 can be disposed below the bulkhead cover primary port 64. More particularly, in the illustrated embodiment, the screen 100 can be integrally formed with the forward wall 70. The screen 100 can be structurally configured to function the same or similar to the screen 32 of the embodiment shown in FIG. 1, though this is not required. The deflector 102 can extend forwardly below the primary port 64. Like the deflector 38 of FIG. 1, the deflector 102 can circuitously redirect air flow passing from the grille 52 to the intake port 60 to inhibit liquid and/or debris from reaching the intake port 60.

In operation, air flow enters grille 52 through the one or more inlet apertures 54 spaced apart vertically below the deflector 102. The airflow admitted through the grille 52 generally travels long airflow path 104, which is circuitously directed around the deflector 102 and through the screen 100 of the primary port 64 and then onto the intake port 60. The airflow admitted through the grille 52 can also travel up and through the secondary port 66, which prevents a vacuum condition from occurring at the primary port 64.

Figure 2:
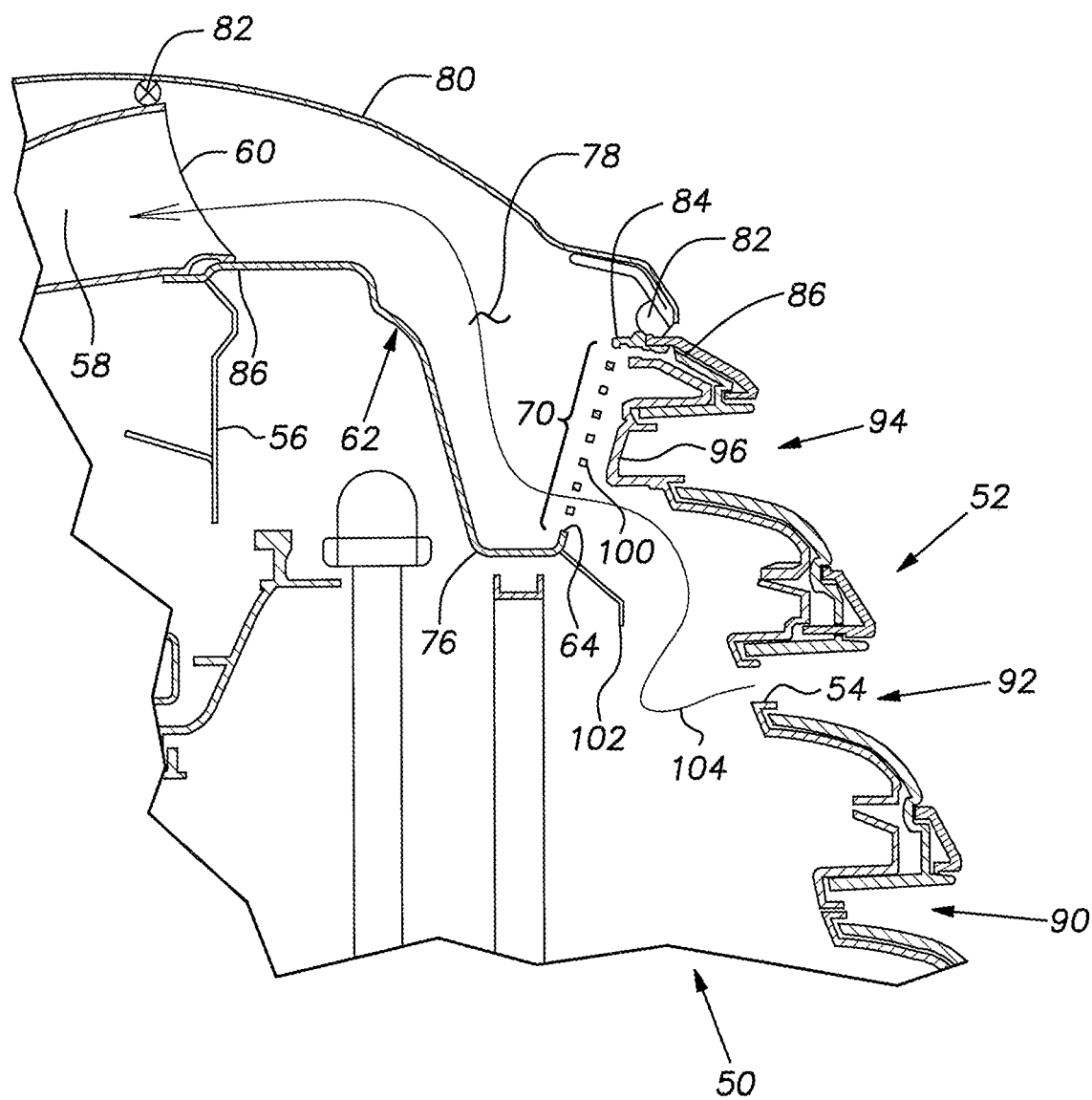
FIG. 2. is a sectional view similar to FIG. 1, but of another vehicle air intake system also having an over bulkhead air intake.
Figure 3:
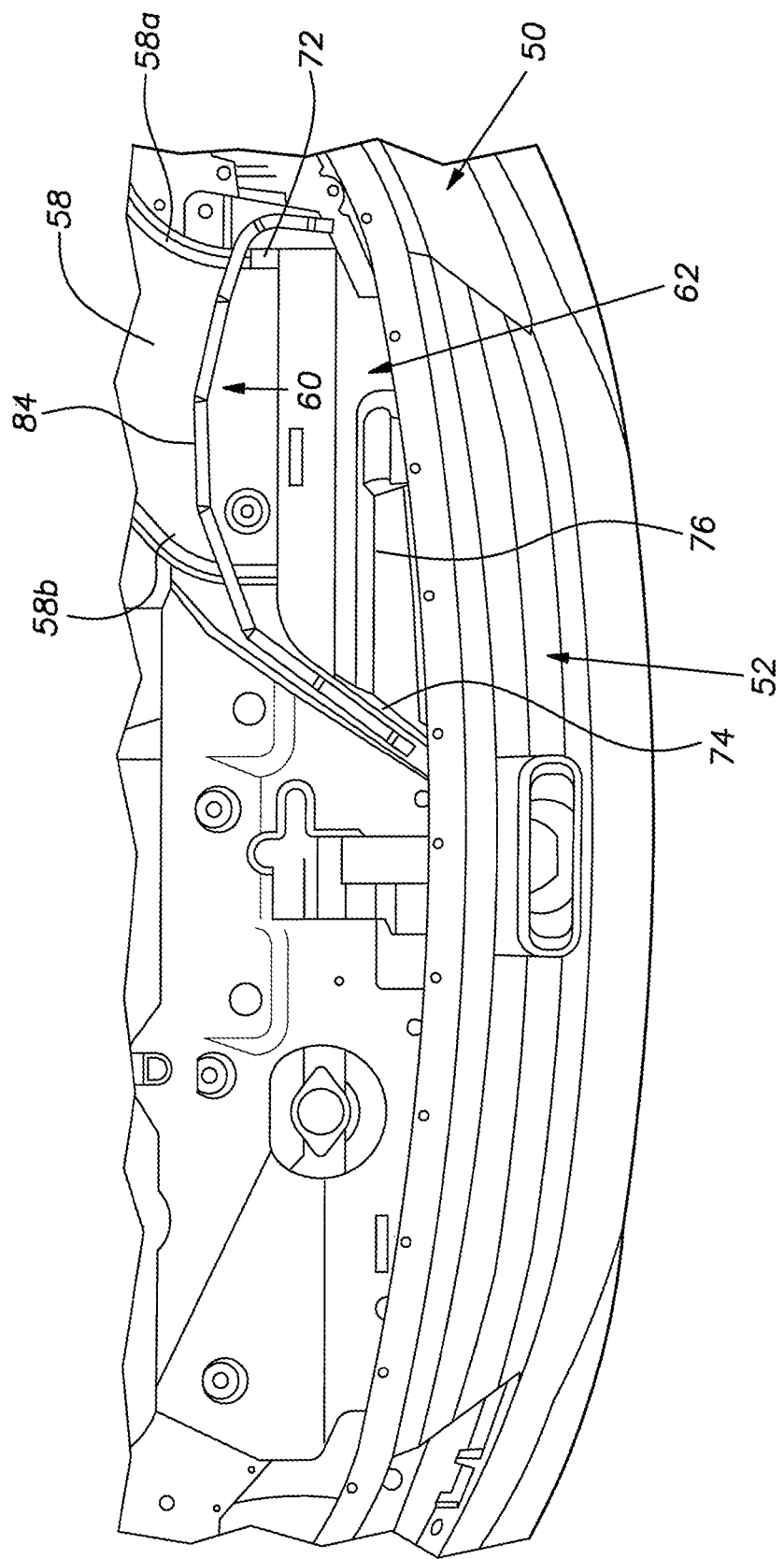
FIG. 3 is a top plan view of the vehicle air intake system of FIG. 2 shown with a hood of the vehicle removed.
Figure 4:
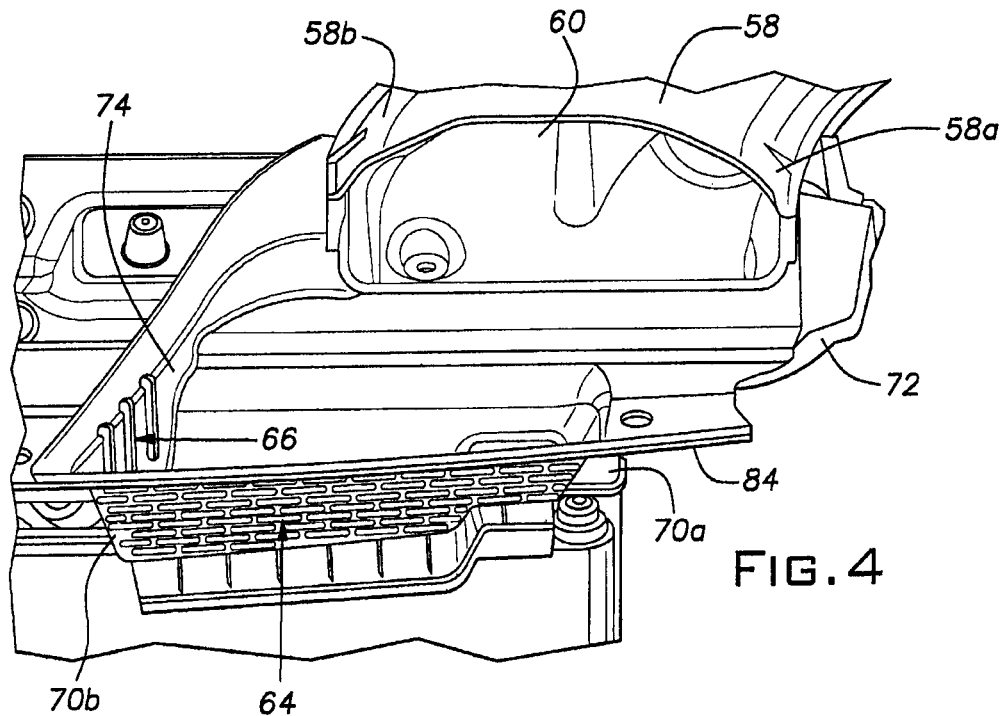
FIG. 4 is a perspective view of a bulkhead cover and an intake enclosure of the vehicle air intake system of FIG. 2.
Figure 5:
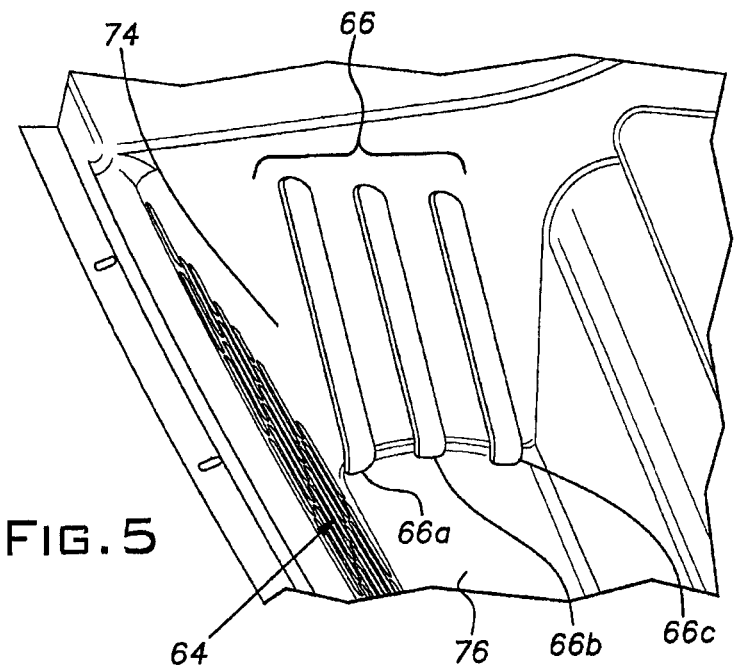
FIG. 5 is an enlarged partial perspective view of a side wall of the bulkhead cover which defines a bulkhead cover auxiliary port.
Figure 6:
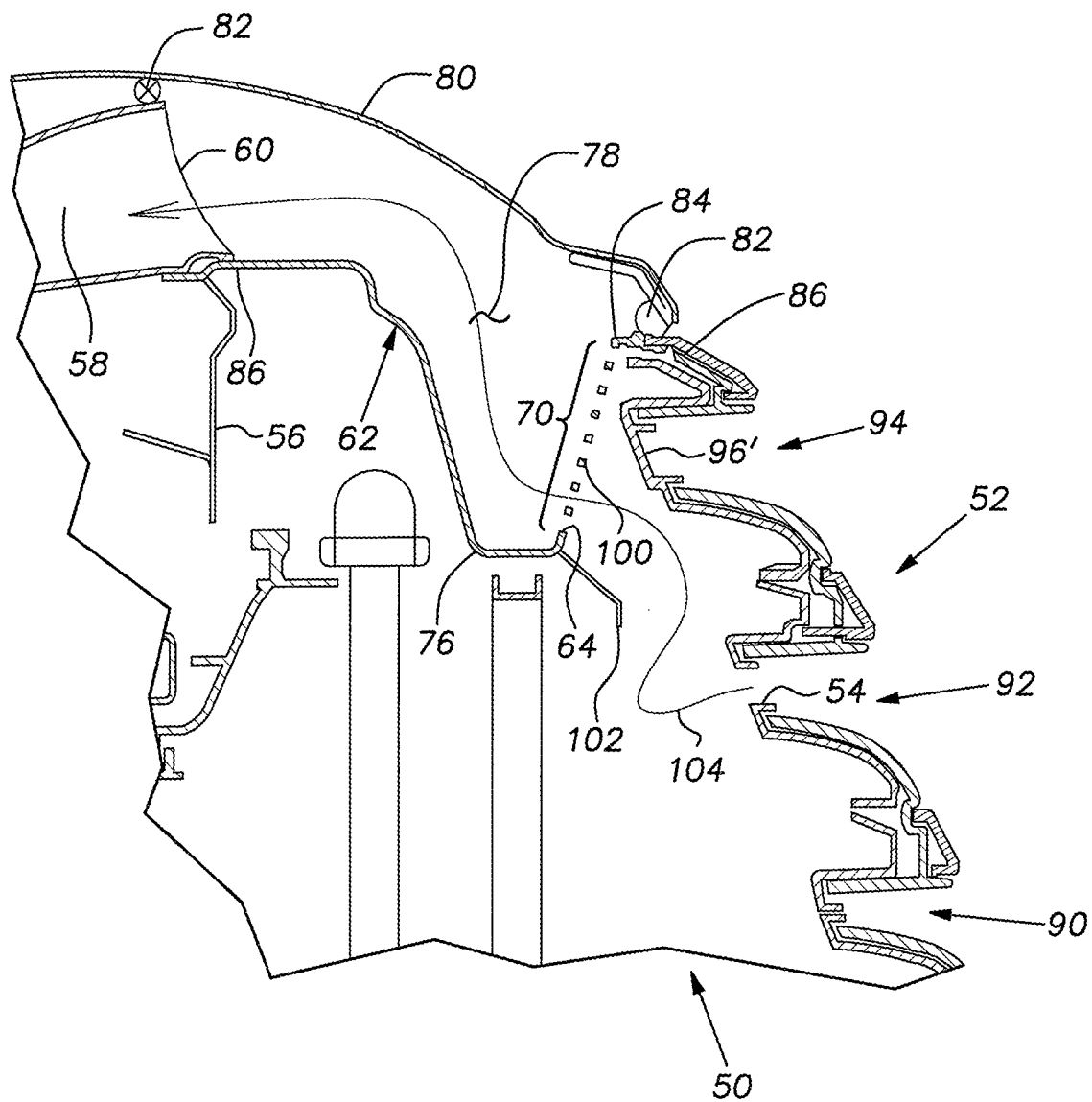
FIG. 6 is a sectional view similar to FIG. 2, but showing an alternate blocking portion disposed forward of the bulkhead cover.

With additional reference to FIG. 6, the blocking portion 96 of FIG. 2 can be replaced with a blocking portion 96' that is angled away from the primary port 64 and is oriented approximately parallel to an angle of the grille 52 and/or the grille openings 54. More particularly, a lower portion of the blocking portion 96' is moved forward away from the port 64. This further mitigates against any vacuum condition being created at the primary port 64. In particular, angling the blocking portion 96' away from the primary port 64 in combination with the auxiliary port 66 can effectively reduce any vacuum condition (i.e., reduce overall velocity) at the primary port 66.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A vehicle air intake system, comprising:
a grille disposed along a forward end of a vehicle, the grille having one or more inlet apertures for admitting airflow;
a bulkhead extending laterally across the vehicle rearwardly of the grille;
an intake enclosure having an intake port disposed over the bulkhead;
a bulkhead cover extending from the bulkhead to the grille, the bulkhead cover defining a bulkhead cover primary port and a bulkhead cover auxiliary port, both for allowing the airflow admitted by the grille to pass to the intake port of the intake enclosure,
wherein the bulkhead cover further includes:
a forward wall defining the bulkhead cover primary port for receiving an airflow admitted through the grille,
a first side wall extending from an outer lateral side of the forward wall to an outer lateral side of the intake enclosure, and
a second side wall extending from an inner lateral side of the forward wall to an inner lateral side of the intake enclosure, the intake enclosure defining the intake port between the outer and inner lateral sides of the intake enclosure;
wherein the bulkhead cover auxiliary port is defined in the second side wall for receiving additional airflow admitted through the grille and thereby reducing snow ingestion through the bulkhead cover primary port.

2. The bulkhead cover of claim 1 wherein the grille includes a blocked portion disposed closely adjacent the bulkhead cover primary port.

3. The bulkhead cover of claim 2 wherein the blocked portion restricts airflow into the bulkhead cover primary port by covering approximately 50% of the bulkhead cover primary port.

4. The bulkhead cover of claim 1 wherein the grille includes an upper recessed aperture disposed closely adjacent the bulkhead cover primary port and a lower recessed aperture disposed below the upper recessed aperture, the upper recessed aperture blocked to prevent airflow from passing therethrough.

5. The bulkhead cover of claim 4 wherein the upper recessed aperture is blocked by a wall portion disposed less than 20 mm from the bulkhead cover primary port.

6. The bulkhead cover of claim 5 wherein the wall portion is disposed less than 10 mm from the bulkhead cover primary port.

7. The bulkhead cover of claim 1 further comprising:
a screen disposed over the bulkhead cover primary port.

8. The bulkhead cover of claim 7 wherein the screen is integrally formed with the forward wall.

9. The bulkhead cover of claim 1 further comprising:
a deflector disposed below the bulkhead cover primary port and extending forwardly therefrom.

10. The bulkhead cover of claim 9 wherein airflow enters the grille through one or more inlet apertures spaced apart vertically below the deflector.

11. The bulkhead cover of claim 1 wherein the forward wall faces forward and downward at a negative angle relative to a forward direction of travel of the vehicle.

12. The bulkhead cover of claim 1 further comprising:
a lower wall extending from the forward wall to the intake enclosure below the intake port of the intake enclosure, the lower wall, the forward wall and the first and second side walls together defining a bulkhead cover airflow chamber forward of the intake port of the intake enclosure.

13. The bulkhead cover of claim 12 wherein a hood of the vehicle or a plastic cover further defines an upper boundary of the bulkhead cover airflow chamber.

14. The bulkhead cover of claim 1 wherein the bulkhead cover auxiliary port includes three vertically extending slots defined in the second side wall.

15. A vehicle air intake system, comprising:
a grille disposed along a forward end of a vehicle, the grille having one or more inlet apertures for admitting airflow;
a bulkhead extending laterally across the vehicle rearwardly of the grille;
an intake enclosure having an intake port disposed over the bulkhead;
a bulkhead cover extending from the bulkhead to the grille, the bulkhead cover defining a bulkhead cover primary port and a bulkhead cover auxiliary port, both for allowing the airflow admitted by the grille to pass to the intake port of the intake enclosure, wherein the bulkhead cover includes:
a forward wall defining the bulkhead cover primary port,
a first side wall extending from an outer lateral side of the forward wall to the intake enclosure, and
a second side wall extending from an inner lateral side of the forward wall to the intake enclosure, the second side wall defining the bulkhead cover auxiliary port, and wherein the bulkhead cover primary port includes a screen and the bulkhead cover auxiliary port is formed as a plurality of vertically oriented slots.

16. The vehicle air intake system of claim 15 further including:
a radiator disposed rearwardly of the grille and below the bulkhead for receiving a portion of the airflow admitted through the grille.

17. A vehicle air intake system comprising:
a grille disposed along a forward end of a vehicle, the grille having one or more inlet apertures for admitting airflow;
a bulkhead extending laterally across the vehicle rearwardly of the grille;
an intake enclosure having an intake port disposed over the bulkhead;
a bulkhead cover extending from the bulkhead to the grille, the bulkhead cover defining a bulkhead cover primary port and a bulkhead cover auxiliary port, both for allowing the airflow admitted by the grille to pass to the intake port of the intake enclosure,
wherein the bulkhead cover includes:
a forward end connected to an upper portion of the grille,
a rearward end connected to the bulkhead,
a forward wall defining the primary port for allowing airflow from the grille to pass to an intake port of an air intake enclosure disposed over the bulkhead, and
a sidewall defining the auxiliary port for allowing airflow to pass to the intake port and reducing a vacuum condition at the primary intake port.

18. The bulkhead cover of claim 17 wherein the sidewall is oriented approximately normal relative to the forward wall, the sidewall and forward wall together defining a bulkhead cover chamber below and upstream of the intake port.

19. The vehicle air intake system of claim 3 wherein the blocked portion is angled away from the primary port and is oriented approximately parallel to an angle of the grille.

20. The vehicle air intake system of claim 3 wherein the blocked portion is approximately parallel to the primary port.

21. The bulkhead cover of claim 3 wherein the bulkhead cover auxiliary port includes three vertically extending slots defined in the second side wall.

\* \* \* \* \*